US012637488B2

(12) United States Patent
Sanner

(10) Patent No.: US 12,637,488 B2
(45) Date of Patent: May 26, 2026

(54) METHOD FOR THE SYNTHESIS OF IRIDIUM ORGANOMETALLIC MATERIAL

(71) Applicant: Lawrence Livermore National Security, LLC, Livermore, CA (US)

(72) Inventor: Robert Dean Sanner, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 1345 days.

(21) Appl. No.: 16/980,776

(22) PCT Filed: Jul. 27, 2018

(86) PCT No.: PCT/US2018/044217
§ 371 (c)(1),
(2) Date: Sep. 14, 2020

(87) PCT Pub. No.: WO2020/023063
PCT Pub. Date: Jan. 30, 2020

(65) Prior Publication Data
US 2021/0363167 A1 Nov. 25, 2021

(51) Int. Cl.
*C07F 15/00* (2006.01)
*C09K 11/06* (2006.01)

(52) U.S. Cl.
CPC .......... *C07F 15/0033* (2013.01); *C09K 11/06* (2013.01); *C09K 2211/185* (2013.01)

(58) Field of Classification Search
CPC ................. C07F 15/0033; C09K 11/06; C09K 2211/185; C09K 2211/1007; C09K 2211/1029
See application file for complete search history.

(56) References Cited

U.S. PATENT DOCUMENTS

| | | | |
|---|---|---|---|
| 2002/0182441 A1 | 12/2002 | Lamansky et al. |
| 2005/0214576 A1 | 9/2005 | Lamansky et al. |
| 2008/0290792 A1 | 11/2008 | Takeuchi et al. |
| 2012/0309971 A1 | 12/2012 | Cai et al. |

FOREIGN PATENT DOCUMENTS

| | | | | |
|---|---|---|---|---|
| JP | 2002105055 A * | 4/2002 | |
| WO | WO-2005118606 A1 * | 12/2005 | .......... C07F 15/0033 |

OTHER PUBLICATIONS

Konno H. WO-2005118606-A1. English Translation. 2005. (Year: 2005).*
Axtell, J., et al. Blue Phosphorescent Zwitterionic Iridium(III) Complexes Featuring Weakly Coordinating nido-Carborane-Based Ligands. J. Am. Chem. Soc. 2016, 138, 15758-15765. (Year: 2016).*
Axtell, J., et al. Supporting Information. J. Am. Chem. Soc. 2016, 138. (Year: 2016).*
Sigma-Aldrich. Safety Data Sheet. 1,2-dimethoxyethane. www.sigmaaldrich.com. 2023. (Year: 2023).*
Merriam-Webster. derivative. https://www.merriam-webster.com/dictionary/derivative?utm_campaign=sd&utm_medium=serp&utm_source=jsonld. Web. 2023 (Year: 2023).*
Igarashi T. JP-2002105055-A. English Translation. (2002). (Year: 2002).*
Sigma-Aldrich. Safety Data Sheet. 1,2-dichloroethane. (Year: 2024).*
International Search Report and Written Opinion from PCT Application No. PCT/US2018/044217, dated Aug. 2, 2019.
Lamansky et al., "Synthesis and Characterization of Phosphorescent Cyclometalated Iridium Complexes," Inorganic Chemistry, vol. 40, No. 7, 2001, pp. 1704-1711.
Congrave et al., "Synthesis, Diastereomer Separation, Optoelectronic and Structural Properties of Dinuclear Cyclometalated Iridium(III) Complexes with Bridging Diarylhydrazide Ligands," Organometallics, vol. 36, No. 5, 2017, 19 pages.
Lamansky et al., "Highly Phosphorescent Bis-Cyclometalated Iridium Complexes: Synthesis, Photophysical Characterization, and Use in Organic Light Emitting Diodes," Journal of the American Chemical Society, vol. 123, 2001, pp. 4304-4312.
Tamayo et al., "Synthesis and Characterization of Facial and Meridional Tris-cyclometalated Iridium(III) Complexes," Journal of the American Chemical Society, vol. 125, 2003, pp. 7377-7387.
Li et al., "Synthesis and characterization of cyclometalated Ir(III) complexes with pyrazolyl ancillary ligands," Polyhedron, vol. 23, 2004, pp. 419-428.
Li et al., "Synthetic Control of Excited-State Properties in Cyclometalated Ir(III) Complexes Using Ancillary Ligands," Inorganic Chemistry, vol. 44, 2005, pp. 1713-1727.
Gupta et al., "Energy transfer and morphology study of a new iridium based cyclometalated phosphorescent complex," Optical Materials, vol. 28, 2006, pp. 1355-1361.
Adachi et al., "Endothermic energy transfer: A mechanism for generating very efficient high-energy phosphorescent emission in organic materials," Applied Physics Letters, vol. 79, No. 13, Sep. 24, 2001, pp. 2082-2084.
Yi et al., "Stable Blue Phosphorescence Iridium(III) Cyclometalated Complexes Prompted by Intramolecular Hydrogen Bond in Ancillary Ligand," Inorganic Chemistry, vol. 55, 2016, pp. 3324-3331.
You et al., "Phosphorescent iridium(III) complexes: toward high phosphorescence quantum efficiency through ligand control," Dalton Transactions, No. 8, Feb. 28, 2009, pp. 1267-1282.

(Continued)

*Primary Examiner* — Andrea Olson
*Assistant Examiner* — Samuel L Galster
(74) *Attorney, Agent, or Firm* — Zilka-Kotab, P.C.

(57) ABSTRACT

According to one embodiment, a method of synthesizing an organometallic iridium monomer compound includes obtaining a dimeric iridium compound having a halogenated bridge, refluxing a mixture comprising the dimeric iridium compound, a base, an ancillary ligand, and 1,2-dimethoxyethane for forming a precipitate of an organometallic iridium monomer, and filtering the refluxed mixture to collect the organometallic iridium monomer precipitate.

20 Claims, 9 Drawing Sheets

(56) References Cited

OTHER PUBLICATIONS

Baranoff et al., "Acid-Induced Degradation of Phosphorescent Dopants for OLEDs and Its Application to the Synthesis of Tris-heteroleptic Iridium(III) Bis-cyclometalated Complexes," Inorganic Chemistry, vol. 51, 2012, pp. 215-224.
Baranoff et al., "Influence of Halogen Atoms on a Homologous Series of Bis-Cyclometalated Iridium(III) Complexes," Inorganic Chemistry, vol. 51, 2012, pp. 799-811.
International Preliminary Examination Report from PCT Application No. PCT/US2018/044217, dated Feb. 11, 2021.
Wang et al., "Effect of diphenylamine substituent on charge-transfer absorption features of the iridium complexes and application in dye-sensitized solar cell," Journal of Organometallic Chemistry 775, Oct. 30, 2014, pp. 55-59.
Marin-Suarez et al., "Nanocomposites Containing Neutral Blue Emitting Cyclometalated Iridium(III) Emitters for Oxygen Sensing," Chemistry of Materials 2012, vol. 24, May 24, 2012, pp. 2330-2338.
Feng et al., "Spectral- and Pulse-Shape Discrimination in Triplet-Harvesting Plastic Scintillators," IEEE Transactions on Nuclear Science, vol. 59, No. 6, Dec. 2012.
Rupert et al., "Bismuth-loaded plastic scintillators for gamma-ray spectroscopy," EPL, vol. 97, Jan. 18, 2012, pp. 22002-pl-22002-p4.
Sguerra et al., "Thermo- and radioluminescent polystyrene based plastic scintillators doped with phosphorescent iridium(III) complexes," Journal of Materials Chemistry C, vol. 2, 2014, pp. 6125-6133.
Costa et al., "Recent advances in light-emitting electrochemical cells," Pure Appl. Chem., vol. 83, No. 12, Oct. 31, 2011, pp. 2115-2128.
Evariste et al., "Fluorine-free blue-green emitters for light-emitting electrochemical cells," Journal of Materials Chemistry C, vol. 2, 2014, pp. 5793-5804.
Choy et al., "Recent Advances in Transition Metal Complexes and Light-Management Engineering in Organic Optoelectronic Devices," Advanced Materials, vol. 26, 2014, pp. 5368-5399.
Wong et al., "Heavy metal organometallic electrophosphors derived from multi-component chromophores," Coordination Chemistry Reviews, vol. 253, 2009, pp. 1709-1758.
Baranoff et al., "Cyclometallated iridium complexes for conversion of light into electricity and electricity into light," Journal of Organometallic Chemistry, vol. 694, 2009, pp. 2661-2670.
Fu et al., "Feeling blue? Blue phosphors for OLEDs, " Materials Today, vol. 14, No. 10, Oct. 2011, pp. 472-479.
Baldo et al., "High-efficiency fluorescent organic light-emitting devices using a phosphorescent sensitizer," Nature, vol. 403, Feb. 17, 2000, pp. 750-753.
Baranoff et al., "Flrpic: archetypal blue phosphorescent emitter for electroluminescence," Dalton Transactions, vol. 44, 2015, pp. 8318-8329.
Nonoyama, M., "Benzo[h]quinolin-10-yl-N Iridium (III) Complexes," Bulletin of the Chemical Society of Japan, vol. 47, No. 3, 1974, pp. 767-768.
Shin et al., "Polymorphism-induced dual phosphorescent emission from solid-state iridium(III) complex," Dalton Transactions, Jul. 2, 2009, pp. 6476-6479.
Groom et al., "The Cambridge Structural Database," Acta. Cryst., vol. B, No. 72, 2016, pp. 171-179.
Kim et al., "cis-(2-Acetylcyclopentanonato-j2O,O0)-bis(2-pyridylphenyl-jN)iridium(III) dichloromethane solvate," Acta Crystallographica, Section E, No. 62, 2006, pp. m2403-m2405.
Frey et al., "Structure-property relationships based on Hammett constants in cyclometalated iridium(III) complexes: their application to the design of a fluorine-free FlrPic-like emitter," Dalton Transactions, vol. 43, 2014, pp. 5667-5679.
Sykes et al. "Sensitisation of Eu(III)- and Tb(III)-based luminescence by Ir(III) units in Ir/lanthanide dyads: evidence for parallel energy-transfer and electron-transfer based mechanisms," Dalton Transactions, vol. 43, 2014, pp. 6414-6428.
Spek, A. L., "Single-crystal structure validation with the program PLATON," Journal of Applied Crystallography, vol. 36, 2003, pp. 7-13.
Spek, A. L., "Platon Squeeze: a tool for the calculation of the disordered solvent contribution to the calculated structure factors," Acta Crystallographica, Section C, No. 71, 2015, pp. 9-18.
Kozhevnikov et al., "Cyclometalated Ir(III) Complexes for High-Efficiency Solution Processable Blue PhOLEDs," Chemistry of Materials, vol. 25, No. 11, 2013, pp. 1-17.
Baranoff et al., "Room-temperature combinatorial screening of cyclometallated iridium(III) complexes for a step towards molecular control of colour purity," Dalton Transactions, vol. 40, 2011, pp. 6860-6867.
Xu et al., "Cyclometalated Pd(II) and Ir(III) 2-(4-bromophenyl)-pyridine complexes with N-heterocyclic carbenes (NHCs) and acetylacetonate (acac): synthesis, structures, luminescent properties and application in one-pot oxidation/Suzuki coupling of aryl chlorides containing hydroxymethyl," Dalton Transactions, vol. 43, 2014, pp. 10235-10247.
Zhu et al., "Synthesis and red electrophosphorescence of a novel cyclometalated iridium complex in polymer light-emitting diodes," Thin Solid Films, vol. 446, 2004, pp. 128-131.
Zhou et al., "Electrogenerated Chemiluminescence from Heteroleptic Iridium(III) Complexes with Multicolor Emission," Inorganic Chemistry, vol. 54, 2015, pp. 1446-1453.
Gu et al., "Tuning the Emission Color of Iridium(III) Complexes with Ancillary Ligands: A Combined Experimental and Theoretical Study," European Journal of Inorganic Chemistry, 2009, pp. 2407-2414.
Liu et al., "Highly efficient, orange-red organic light-emitting diodes using a series of green-emission iridium complexes as hosts," Organic Electronics, vol. 10, 2009, pp. 247-255.
Kim et al., "Novel Green Phosphorescent Materials with Various Substituted Acetylacetonate Ligands for Organic Electroluminescent Device," Molecular Crystals and Liquid Crystals, vol. 424, 2004, pp. 111-117.
Dumur et al., "Phosphorescent organic light-emitting devices (PhOLEDs) based on heteroleptic bis-cyclometalated complexes using acetylacetonate as the ancillary ligand," Synthetic Metals, vol. 198, 2014, pp. 131-136.
Kim et al., "Iridium Complexes with 3-Methyl-2,4-Pentanedione Ligand for Organic Electroluminescent Device," Journal of Nonlinear Optical Physics & Materials, vol. 14, No. 4, 2005, pp. 529-534.
Mauro et al., "Aggregation induced colour change for phosphorescent iridium(III) complex-based anionic surfactants," Dalton Transactions, vol. 40, 2011, pp. 12106-12116.
Zhou et al., "Substituent effect of ancillary ligands on the luminescence of bis[4,6-(di-fluorophenyl)-pyridinato-N,C2?] iridium(III) complexes," Dalton Transactions, vol. 41, 2012, pp. 9373-9381.

* cited by examiner ppy (a)

$F_2ppy$ (b)

pic (c)

acac (d)

(a)

(b)

(c)

600

602

=

1: X = H
8: X = F

2: X = H
9: X = F

3: X = H
10: X = F

4: X = H
11: X = F

5: X = H
12: X = F

13: X = F

6: X = H
14: X = F

7: X = H
15: = F

1. X = Y = H
2. X = OH, Y = H
3. X = H, Y = F
4. X = H, Y = $CF_3$
5. X = Y = F

(a)

6. X = Y = H (Firpic)
7. X = OH, Y = H
8. X = H, Y = F
9. X = H, Y = $CF_3$
10. X = Y = F

(b)

11

(c)

METHOD FOR THE SYNTHESIS OF IRIDIUM ORGANOMETALLIC MATERIAL

The United States Government has rights in this invention pursuant to Contract No. DE-AC52-07NA27344 between the United States Department of Energy and Lawrence Livermore National Security, LLC for the operation of Lawrence Livermore National Laboratory.

CROSS-REFERENCE TO RELATED PATENT APPLICATIONS

This application claims priority to International Application Number PCT/US2018/044217, which is herein incorporated by reference.

FIELD OF THE INVENTION

The present invention relates to methods of chemical synthesis, and more particularly, this invention relates to method of synthesis of high-yield of an iridium organometallic material.

BACKGROUND

Phosphorescent cyclometallated iridium(III) compounds are used in a variety of applications including solar cells, sensors, bioimaging, and scintillators. Moreover, the electrophosphorescence property of phosphorescent cyclometallated iridium(III) compounds has allowed these compounds to become prevalent in light-emitting electrochemical cells, electrogenerated chemiluminescence, and organic light-emitting diodes (OLEDs).

The strong spin-orbit coupling prompted by the iridium atom allows for mixing of singlet and triplet excited states through efficient intersystem crossing. As a result, phosphorescence quantum yields are increased beyond typical yields obtained with fluorescent emitters.

These cyclometallated iridium(III) complexes may be classified based on their associated ligands. In FIG. 1, parts (a) and (b) illustrate examples of cyclometallating ligands. Homoleptic iridium compounds have identical ligands that may include either the ligand 2-phenylpyridinato (abbreviated as "ppy" in part (a)), or the ligand 2-(4',6'-difluorophenyl)pyridinato (abbreviated as "$F_2$ppy" in part (b)). Examples of homoleptic iridium compounds may include $Ir(ppy)_3$ and $Ir(F_2ppy)_3$.

In contrast, heteroleptic iridium compounds have at least two different ligands that may include the ligand picolinate or pyridine-2-carboxylate (abbreviated as "pic" in part (c)) or the ligand acetylacetonate (abbreviated as "acac" in part (d)). Examples of heteroleptic iridium compounds may include $(F_2ppy)_2$Ir(pic) and ($F_2$ppy)(ppy)Ir(acac). The cyclometallating ligands, such as ppy or $F_2$ppy contain a (C^N) core, whereas the ligands pic and acac are characterized as ancillary ligands.

The heteroleptic compound $(F_2ppy)_2$Ir(pic), commonly referred to as FIrpic, has been well studied, but also the class of heteroleptic compounds containing acac as the ancillary ligand has gained attention, recently. Heteroleptic compounds such as $(ppy)_2$Ir(acac) and $(F_2ppy)_2$Ir(acac), also known as FIracac, and a variety of substituted β-diketonates have been the subject of recent spectroscopic and theoretical studies.

Conventional processes for forming organometallic iridium complexes as luminescent materials typically involve a two-step process beginning with an iridium chloride and various cyclometallating organic molecules as ligands. The first step usually uses a 3:1 mixture of 2-ethoxyethanol and water as solvent and produces a dimeric iridium complex containing organic ligands and bridging chlorides. The second step is a high temperature refluxing reaction in 2-ethoxyethanol solvent at about (e.g., within 5° C. of) the boiling point of the solvent (e.g. 135° C.±5° C. for 2-ethoxyethanol). This second step adds an ancillary organic ligand to produce an iridium monomer product by eliminating the chloride bridges from the iridium dimeric compound. However, the high temperature of the refluxing reaction and nature of the solvent 2-ethoxyethanol tend to produce an impure product. Thus, after the refluxing reaction the process proceeds with several additional purification steps, usually culminating in column chromatography.

These subsequent purification steps tend to be labor intensive using large volumes of solvent. Moreover, the process from the first step to the product after purification steps tend to be only effective for sample sizes of a few grams. Thus, the conventional process does not lend itself to large scale reactions.

Moreover, methods for large scale production and synthesis of organometallic compounds for OLEDs and other uses of the electrophosphorescence property of these compounds have been elusive. It would be advantageous to develop a simplified method with higher yield and purity of these desirable organometallic compounds.

SUMMARY

According to one embodiment, a method of synthesizing an organometallic iridium monomer compound includes obtaining a dimeric iridium compound having a halogenated bridge, refluxing a mixture comprising the dimeric iridium compound, a base, an ancillary ligand, and 1,2-dimethoxyethane for forming a precipitate of an organometallic iridium monomer, and filtering the refluxed mixture to collect the organometallic iridium monomer precipitate.

Other aspects and advantages of the present invention will become apparent from the following detailed description, which, when taken in conjunction with the drawings, illustrate by way of example the principles of the invention.

BRIEF DESCRIPTION OF THE DRAWINGS

FIG. 8, part (b) is a plot of the $^{19}$F NMR spectrum of a crude FIrpic sample, according to a conventional method of synthesis.

FIG. 9, part (b) is a plot of the $^1$H NMR spectrum of a crude FIrpic sample, according to a conventional method of synthesis.

DETAILED DESCRIPTION

Figure 1:
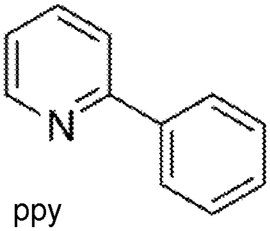
FIG. 1 is a series of schematic drawings of ligands of the iridium compounds, according to various embodiments.
Figure 1:
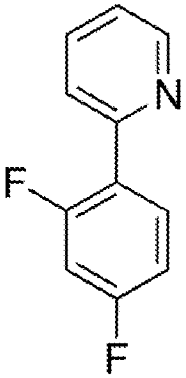
Figure 1:
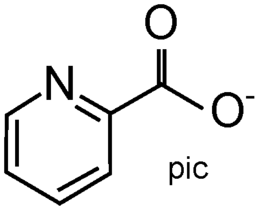
Figure 1:
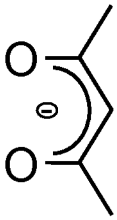

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of synthesis of organometallic compounds and/or related systems and methods.

In one general embodiment, a method of synthesizing an organometallic iridium monomer compound includes obtaining a dimeric iridium compound having a halogenated bridge, refluxing a mixture comprising the dimeric iridium compound, a base, an ancillary ligand, and 1,2-dimethoxyethane for forming a precipitate of an organometallic iridium monomer, and filtering the refluxed mixture to collect the organometallic iridium monomer precipitate.

A list of acronyms used in the description is provided below.

acac acetylacetonate
C Celsius
Cl Chlorine
$CF_3$ Trifluoromethyl
$CO_3$ Carbonate
DFT Density functional theory
DME 1,2-dimethoxyethane
F Fluorine
$F_2$ppy 2-(4',6'-difluorophenyl)pyridinato
FIrpic $(F_2ppy)_2Ir(pic)$
g gram
H Hydrogen
Ir Iridium
mL milliliter
mmol millimole
$Na_2CO_3$ Sodium carbonate
NMR Nuclear magnetic resonance
OH Hydroxy
OLED Organic light emitting diode
pic picolinate or pyridine-2-carboxylate
ppy 2-phenylpyridinato In various embodiments described herein methods for synthesis of iridium organometallic material provide high yield, high purity of the product, less purification time with less purification steps, and opportunities to scale up the process for higher yields of material. In some approaches, synthesis of blue-emitting iridium complexes may be useful in various applications (e.g. plastic scintillators). Moreover, synthesis of longer wavelength emitters and alternate methods to prepare cyclometallated iridium complexes are described herein.

Synthesis of iridium organometallic material includes a two-step reaction process. The first reaction includes the reaction of iridium tri-halide hydrates reacted with neutral ligands, such as cyclometallating ligands, to form iridium dimer compounds having a halogenated bridge. The second reaction involves the addition of an ancillary ligand by reacting the dimeric iridium compound with an ancillary ligand, for example an acetylacetone derivative or a picolinic acid derivative, in a refluxing solvent and a base, for example sodium carbonate.

In various embodiments described herein, a refluxing solvent with a moderate boiling point may be used for the second step of adding a ligand to a dimeric iridium complex with bridging halide. In particular, one embodiment describes an optimal reaction of an ancillary ligand with an iridium dimer compound in a reaction medium of refluxing 1,2-dimethoxyethane in the presence of sodium carbonate ($Na_2CO_3$) at a moderate temperature of 85° C. (e.g. the boiling point of 1,2-dimethoxyethane) for 8 hours or less. In various embodiments, a lower boiling point and less polar characteristics of the solvent may significantly reduce the level of impurities in the iridium monomer product. Moreover, yields of the desired product of the iridium dimer compound with the ancillary ligand obtained after the single step of refluxing followed by a simple filtration may be sufficient to isolate a pure product. In some approaches, the yield of the filtered product obtained by refluxing in 1,2-dimethoxyethane may be equal to or better than yields of the compound obtained by conventional synthesis methods that include additional purification steps (such as column chromatography).

The significant reduction in time for process completion by eliminating post processing purification steps as well as the reduction in material involved in these unnecessary steps allows the process to be scaled for large reaction sizes.

Figure 2:
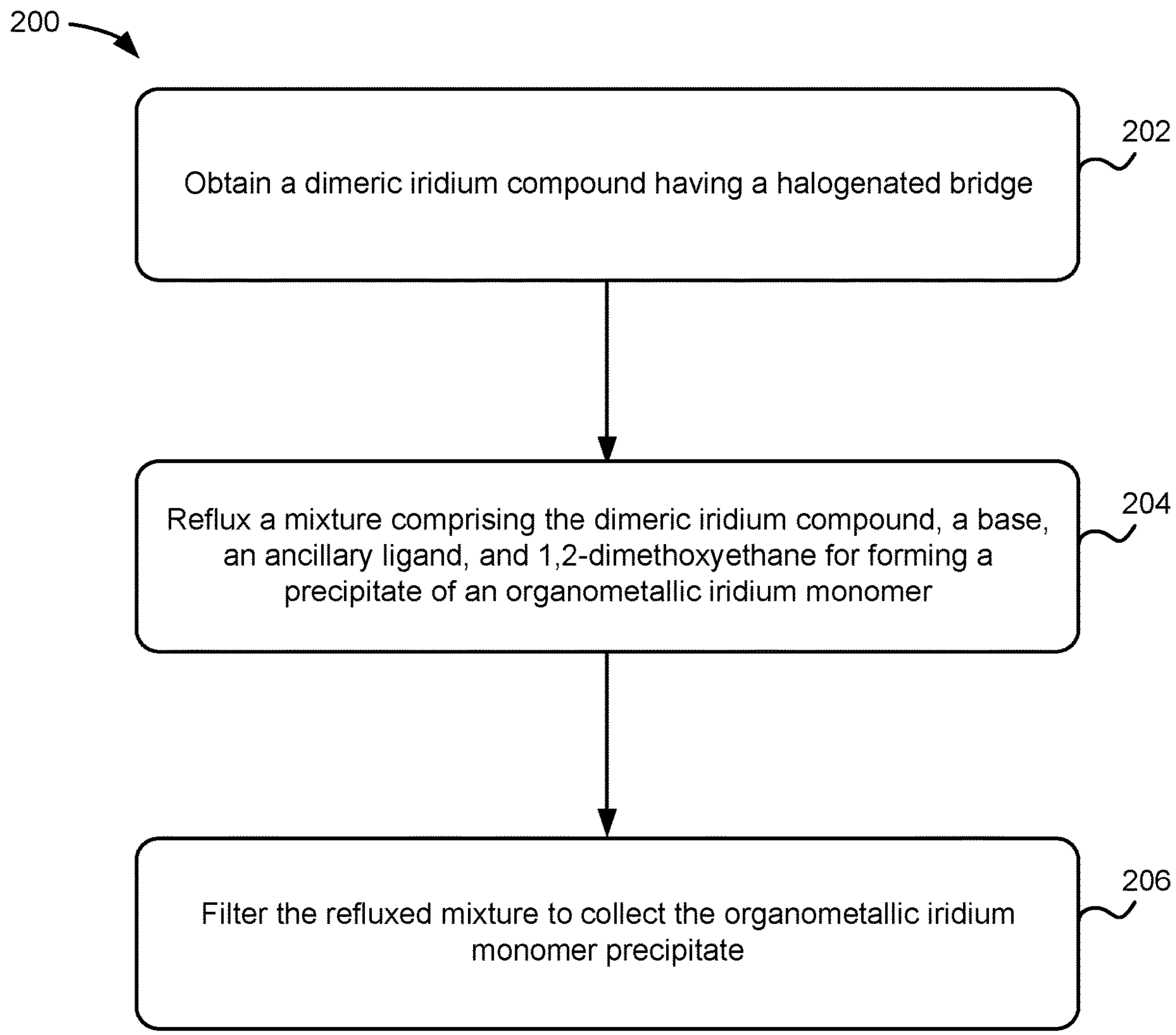
FIG. 2 is a flowchart of a method, according to one embodiment.

FIG. 2 shows a method 200 for synthesizing iridium organometallic material, in accordance with one embodiment. As an option, the present method 200 may be implemented to synthesize material such as those shown in the other FIGS. described herein. Of course, however, this method 200 and others presented herein may be used to provide applications which may or may not be related to the illustrative embodiments listed herein. Further, the methods presented herein may be carried out in any desired environment. Moreover, more or less operations than those shown in FIG. 2 may be included in method 200, according to various embodiments. It should also be noted that any of the aforementioned features may be used in any of the embodiments described in accordance with the various methods.

According to a method 200 for synthesizing an organometallic iridium monomer compound, the first step 202 begins with obtaining a dimeric iridium compound having a halogenated bridge. In some approaches, the dimeric iridium compound having a halogenated bridge may be obtained from a reaction of an iridium tri-halide hydrate reacted with a neutral ligand, for example a neutral ligand may be a cyclometallating ligand. In preferred approaches, the iridium tri-halide hydrate may be an iridium tri-chloride hydrate thereby forming a dimeric iridium compound with a chloride bridge. In some approaches, a dimeric iridium compound may be $[(ppy)_2IrCl]_2$. In other approaches, a dimeric iridium compound may be $[(F_2ppy)_2IrCl]_2$. In various approaches, the dimeric iridium compound may be a cyclometallated iridium complex. In preferred approaches, the dimeric iridium compound may include at least one phenylpyridine ligand.

Step 204 of method 200 includes refluxing a mixture that includes the dimeric iridium compound, a base, an ancillary ligand, and 1,2-dimethoxyethane for forming a precipitate of an organometallic iridium monomer. In various approaches, refluxing the dimeric iridium compound in the presence of ether solvent such as 1,2-dimethoxyethane and a base, for example and not meant to be limiting, sodium carbonate provides a preferred reaction medium for the addition of an ancillary ligand to the dimeric iridium compound.

Figure 3:
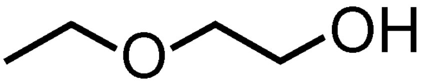
FIG. 3 is a series of schematic drawings of solvents, according to various approaches.
Figure 3:
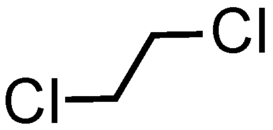
Figure 3:
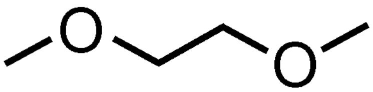

Several solvents are illustrated in FIG. 3. Conventional methods include a glycol ether solvent, such as 2-ethoxyethanol illustrated in part (a) that includes an ether group (—O—) and an alcohol group (—OH). Without wishing to be bound by any theory, it was believed that the alcohol group (—OH) of the solvent in combination with a base enabled efficient addition of the ancillary ligand to the dimeric iridium compound compared to early approaches of synthesizing phosphorescent cyclometallated iridium(III) compounds using 2-dichloroethane illustrated in part (b) as a refluxing solvent. Synthesis studies soon replaced the inefficient 2-dichloroethane solvent with a glycol ether as illustrated in part (a). Furthermore, both these solvents involve additional steps to form a precipitate and to purify the product following reaction.

In contemplated studies, synthesis of iridium(III) compounds using 2-dichloroethane (as illustrated in part (b)) as the solvent have not been shown to be efficient. In particular, less than 50% of the original Jr source could be converted to product and there were multiple steps of post-synthesis purification of the product.

According to various approaches described herein, a preferred solvent for the refluxing step of the mixture may be a di-ether solvent without an alcohol group. For example, a preferred solvent is 1,2-dimethoxyethane (DME) as illustrated in part (c) of FIG. 3. It was surprising that a preferred solvent for the refluxing step may not include an alcohol group, since an alcohol group in the solvent is the convention for efficient refluxing reactions. Moreover, the refluxing mixture resulted in a product in a precipitate form.

In various approaches, the base in the mixture with the refluxing solvent is preferably a carbonate. The carbonate may be sodium carbonate. In other approaches, the carbonate may be potassium carbonate. In preferred approaches, the mixture includes a stoichiometric ratio of five base molecules to one iridium atom in the dimeric iridium compound (5:1). For example, a starting mixture of dimeric iridium compound (2 Jr atoms) may include 10 molar equivalents of base molecules. In preferred approaches, the mixture includes a stoichiometric ratio of two ancillary ligand molecules to one iridium atom in the dimeric iridium compound (2:1). For example, a starting mixture of dimeric iridium compound (2 Jr atoms) may include 4 molar equivalents of ancillary ligand molecules.

In some approaches, the ratio of DME to the dimeric iridium compound is preferably at least 15 milliliters (mL) of 1,2-dimethoxyethane (DME) for each millimole (mmol) of iridium atoms of the starting dimeric iridium compound (15:1). In some approaches, a lesser volume of DME (mL) per mmol of iridium atoms in the mixture of dimeric iridium compound might result in an increased impurity in the product mixture. In other approaches, the ratio of a volume of DME per iridium atom may be higher than 15 mL DME:1 mmol Ir.

The temperature of the refluxing step 204 is preferably the temperature of the boiling point of the solvent used for the refluxing. In some approaches, the temperature of the refluxing may be the boiling point of DME. In some approaches, the temperature of the refluxing may be as low as 85° C.

It was surprising that the refluxing reaction, with the lower boiling point of DME at 85° C., generated reaction conditions that proceeded to completion in a relatively short period of time (less than 8 hours), since lower temperatures typically cause reactions to proceed slower than higher temperatures and may not allow the reaction to proceed to completion. Without wishing to be bound by any theory, it is believed the lower refluxing temperature of the solvent boiling point (e.g., about 85° C. of a DME solvent) and the less polar characteristics of a DME solvent provide gentler conditions for the reaction on the components and thus increases efficiency of yield and purity of the product compared to conventional refluxing temperatures of 135° C., the boiling point of the conventional solvent 2-ethoxyethanol.

In some approaches, the ancillary ligand in the mixture of the refluxing step 204 may be acetylacetone. In other approaches, the ancillary ligand in the mixture of the refluxing step 204 may be an acetylacetone derivative. For example, in some approaches of synthesis of heteroleptic iridium(III) acetylacetonate complexes, the ancillary ligand of the synthesized organometallic iridium monomer compound may be acetylacetonate or an acetylacetonate derivative.

Figure 4:
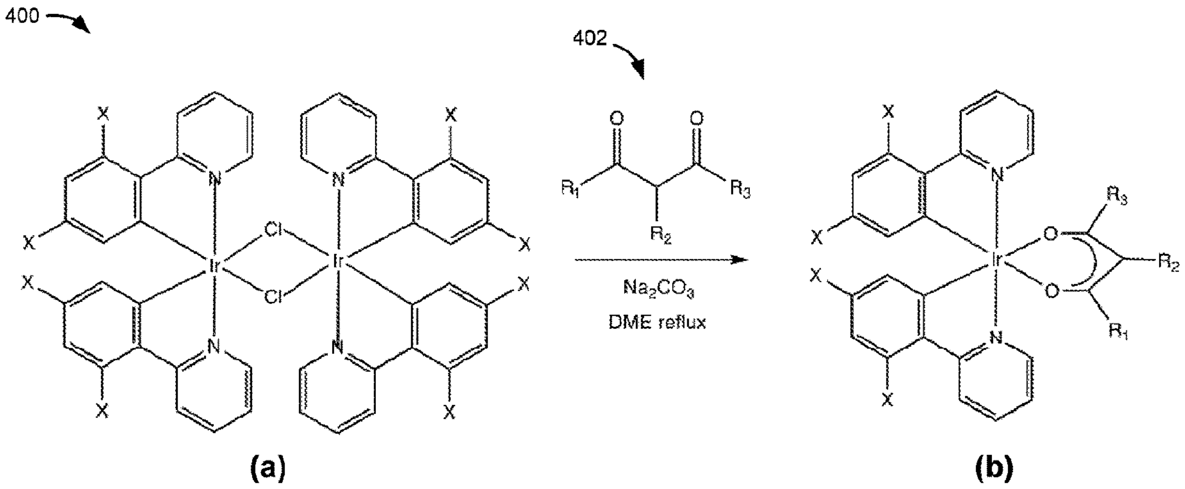
FIG. 4 is a schematic drawing of a reaction, according to one embodiment.

FIG. 4 illustrates a reaction 400 to form a product (b) of a heteroleptic iridium(III) acetylacetonate complex. In various approaches, reaction 400 may form iridium(III) acetylacetonate complexes having the formula $(X_2ppy)_2Ir(acac-R_i)$. As shown in FIG. 4, various versions of the dimeric iridium compound (a) may include X=hydrogen (H) or fluorine (F), and the acetylacetone ligand 402 may have at least one of the following substituents in the $R_i$ position: hydrogen, methyl, trifluoromethyl ($CF_3$), cyclopentyl, cyclohexyl, and phenyl.

In some approaches, the ancillary ligand in the mixture of the refluxing step 204, may be picolinic acid. In other approaches, the ancillary ligand in the mixture of the refluxing step 204 may be a picolinic acid derivative. For example, in some approaches of synthesis of heteroleptic iridium(III) picolinate complexes, the ancillary ligand of the synthesized organometallic iridium monomer compound may be picolinate or a picolinate derivative.

Figure 5:
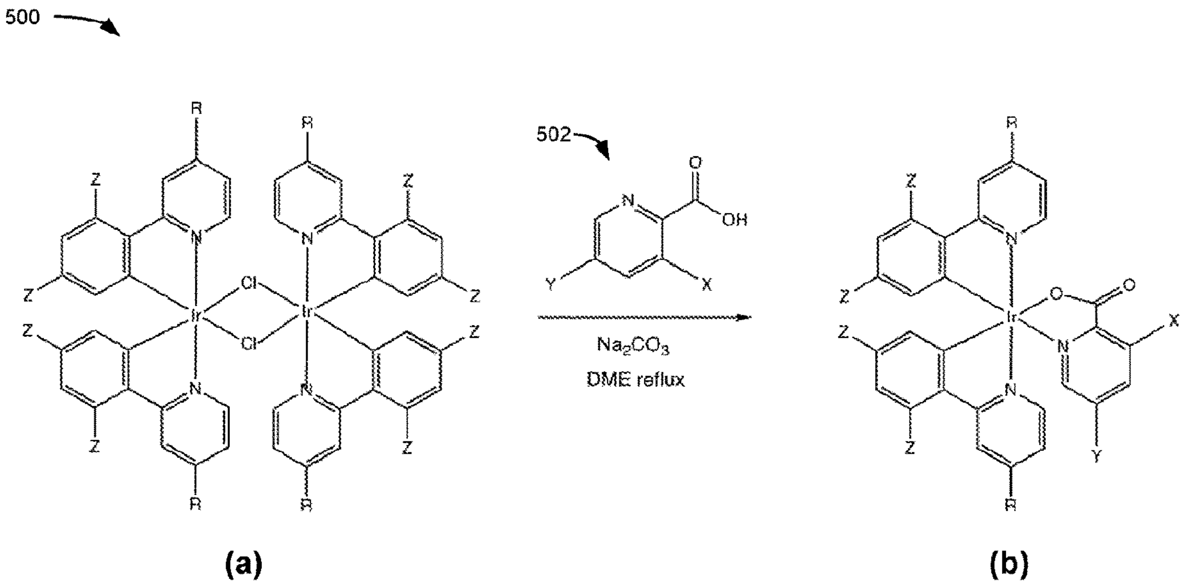
FIG. 5 is a schematic drawing of a reaction, according to one embodiment.

FIG. 5 illustrates a reaction 500 to form a product (b) of a heteroleptic iridium(III) picolinate complex. In various approaches, reaction 500 may form iridium(III) picolinate complexes having the formula $(Z_2ppy)_2Ir(pic\text{-}X,Y)$. As shown in FIG. 5, various versions of the dimeric iridium compound (a) may include Z=H or F, and R=H or xylyl. In addition, versions of picolinic acid ligand 502 may include X and/or Y being a substituent of at least one of the following: H, hydroxy (OH), F, and $CF_3$.

Looking back to FIG. 2, step 204 that includes the refluxing of the reaction mixture typically allows the reaction to go to completion between 6 hours to 15 hours, but the time period could be shorter. In some approaches, the duration of refluxing may be in a range of about 6 hours to about 12 hours. In some approaches, the duration of the refluxing may be less than 6 hours, according to the relative concentrations of the components of the mixture and the formation of the product. A duration of refluxing greater than 12 hours may result in increased levels of impurities in the product.

The product formed from the refluxing step precipitates out of the refluxing solution. In some approaches, the reaction mixture may be quenched in an ice bath to increase the formation of precipitate.

In conventional methods of synthesis, water is added to the product mixture following the refluxing step in order to precipitate the product from the reaction mixture. In contrast, the method of synthesis described herein results in a precipitate of the product at completion of the reaction during refluxing, and thus, no water is added to the final product mixture, according to one embodiment.

Step 206 of method 200 includes filtering the refluxed mixture to collect the organometallic iridium monomer precipitate following the refluxing step (step 204). A conventional filter as understood by one skilled in the art may be used to filter the formed precipitate of the product form the refluxing reaction solvent.

Following a conventional filtration technique the method further includes rinsing the precipitate. In preferred approaches, the precipitate is rinsed first in water to remove residual base and salts from the refluxing mixture, followed by a second rinse of the precipitate in alcohol (e.g. methanol, ethanol, isopropanol, etc.). The rinsed precipitate is then dried.

In various approaches, yields of product following methods of synthesis described herein may be better than yields following conventional synthesis methods. In some approaches, the yield of the product organometallic iridium monomer may be in a range of about 75% to about 95% of the theoretical amount calculated based on the dimeric iridium compound as the limiting reagent in the reaction mixture during refluxing. In some approaches, the yield of organometallic iridium monomer product may be at least 85%. In preferred approaches, the yield of organometallic iridium monomer product may be about 90% of the theoretical amount calculated based on the dimeric iridium compound as the limiting reagent of the mixture during refluxing.

In a method to synthesize the compound FIrpic, the yield of purified FIrpic may be in a range of about 90% to about 95% of the theoretical amount calculated based on the dimeric iridium compound as the limiting reagent in the mixture during refluxing.

The synthesized product may be characterized by elemental analysis, nuclear magnetic resonance (NMR) spectroscopy, electronic spectroscopy, x-ray crystallography, and photophysical measurements In sharp contrast to conventional method of synthesizing phosphorescent iridium(III) complexes, the method described herein preferably does not include an extraction step to purify the formed precipitate. In preferred approaches, the purity of the filtered precipitate following methodology described herein may be determined by NMR spectroscopy in which the filtered precipitate is shown to contain 98% pure product with less than 2% impurities. In some approaches, a purity of the crude filtered precipitate may be at least 98% pure. For example, in some approaches, the method does not include a liquid-liquid extraction step to purify the formed precipitate, nor other type of purification step such as column chromatographic purification.

In various methods described herein, a varied luminescence color palette may be obtained by a simple two-step process that eliminates the need for costly purification steps and may be scalable to large batch preparations.

EXPERIMENTS

Synthesis of FIrpic, a Blue-Emitting Iridium Compound 2.0 g of di[bis(difluorophenylpyridine)(u-chloro)iridium (III)] synthesized by conventional method known by one skilled in the art was added to a stirred solution of 0.81 g picolinic acid and 1.75 g sodium carbonate in 53 mL anhydrous 1,2-dimethoxyethane. The reaction mixture was purged with nitrogen gas and heated at reflux (approximately 85° C.) for 9 hours under a nitrogen atmosphere. This mixture was cooled in an ice bath and filtered. The filter cake was washed with two portions of water and one portion of ice-cold methanol. After vacuum drying, 2.08 g of FIrpic (91% yield) was obtained.

The method as described by various embodiments herein was applied to synthesis of 26 iridium compounds spanning a range of luminescent colors.

Synthesis of Heteroleptic Iridium(III) Acetylacetonates

Figure 6:
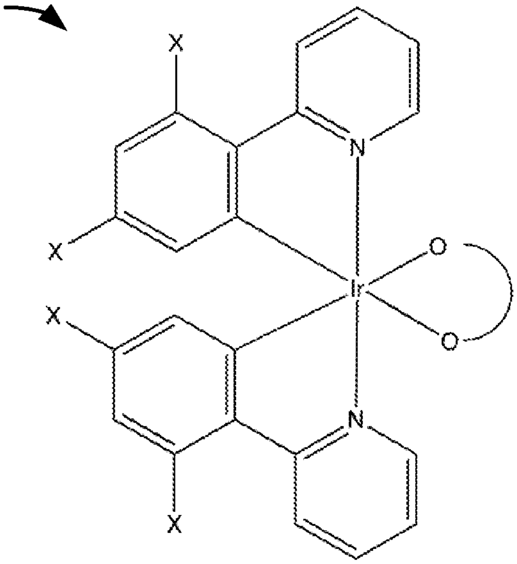
FIG. 6 is a series of schematic drawings of synthesized heteroleptic iridium(III) acetylacetonate compounds, according to one embodiment.
Figure 6:
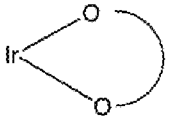
Figure 6:
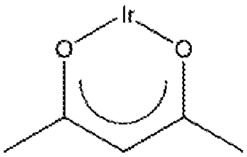
Figure 6:
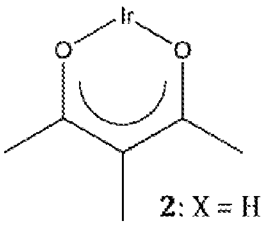
Figure 6:
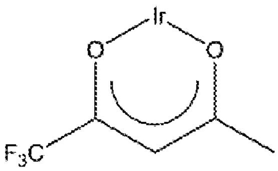
Figure 6:
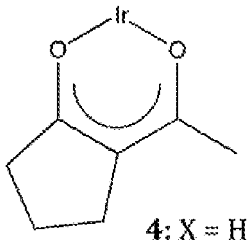
Figure 6:
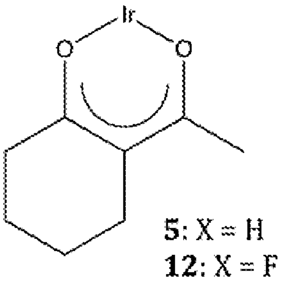
Figure 6:
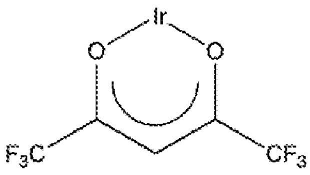
Figure 6:
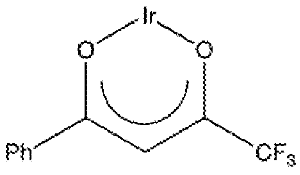
Figure 6:
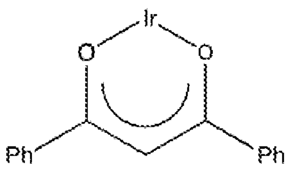

FIG. 6 illustrates the heteroleptic iridium(III) acetylacetonate compounds 1 through 15 formed following methods described herein (as illustrated in reaction 400 of FIG. 4). Compound numbers (bold) indicate the structure formed by the acetylacetonate derivative 602 of the common structure 600 of the product. Compounds 1-7 employed $[(ppy)_2IrCl]_2$ as the iridium source, resulting in a structure 600 where X=H. Compounds 8-15 employed $[(F_2ppy)_2IrCl]_2$ as an iridium source, resulting in a structure 600 where X=F.

Synthesis of Heteroleptic Iridium(III) Picolinates

Figure 7:
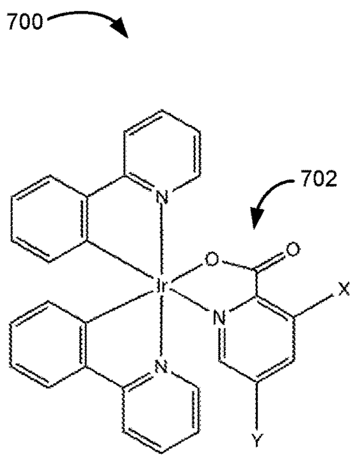
FIG. 7 is a series of schematic drawings of synthesized heteroleptic iridium(III) picolinate compounds, according to one embodiment.
Figure 7:
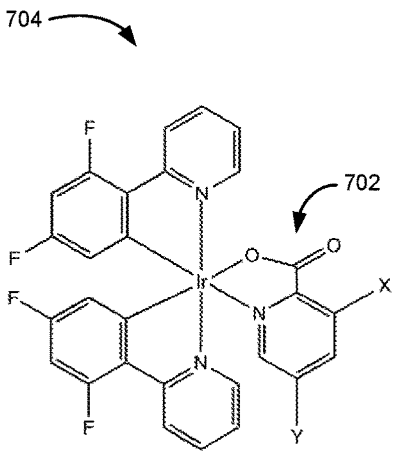
Figure 7:
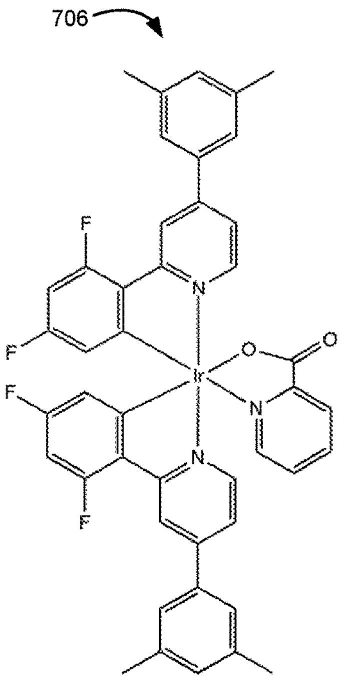

FIG. 7 illustrates the heteroleptic iridium(III) picolinate compounds 1 through 11 formed following methods described herein, (as illustrated in reaction 500 of FIG. 5). Compound numbers (bold) indicate the structure formed by the picolinate derivative 702 of the structure listed in part (a) for compounds 1-5 formed from $[(ppy)_2IrCl]_2$ as the iridium source, resulting in a structure 700, or formed by the picolinate derivative 702 of the structure listed in part (b) for compounds 6-10 formed from $[(F_2ppy)_2IrCl]_2$ as an iridium source, resulting in a structure 704. The keys in part (a) and part (b), define the X and Y substituents of structure 700 and structure 704, respectively, of each compound. Part (c) shows the structure 706 formed from a xylyl-$F_2$ppy ligand on the dimeric iridium species. As noted on FIG. 7, compound 6 of part (b) represents the compound FIrpic as understood by one skilled in the art.

Reaction times were typically 6 to 12 hours of refluxing in DME with yields of product precipitate ranging from 80 to 95% of dimeric iridium source.

The compounds were characterized by elemental analysis, NMR and optical spectroscopy, x-ray crystallography, and photophysical measurements. Density functional theory (DFT) calculations were performed on several of the complexes.

Figure 8:
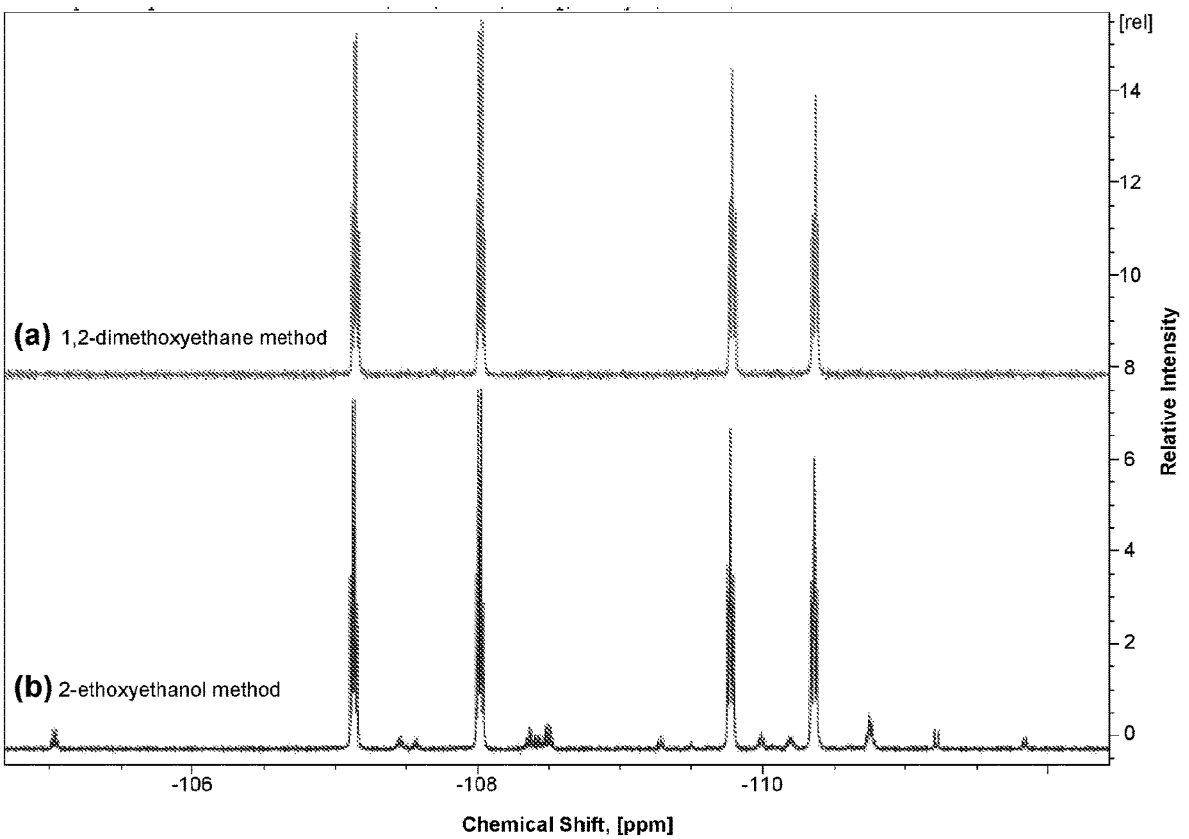
FIG. 8, part (a) is a plot of the $^{19}$F NMR spectrum of a crude FIrpic sample, according to one embodiment.

FIG. 8 illustrates the fluorine nuclear magnetic resonance spectra of crude FIrpic synthesized following the conventional method of using 2-ethoxyethanol (in lower panel (b))

compared to following the method described herein of using DME (in upper panel (a)). The crude sample of FIrpic formed by the conventional method (b) has notable impurities whereas the crude sample of FIrpic formed by the method described herein (a) has much higher purity and no additional purification steps were included.

Figure 9:
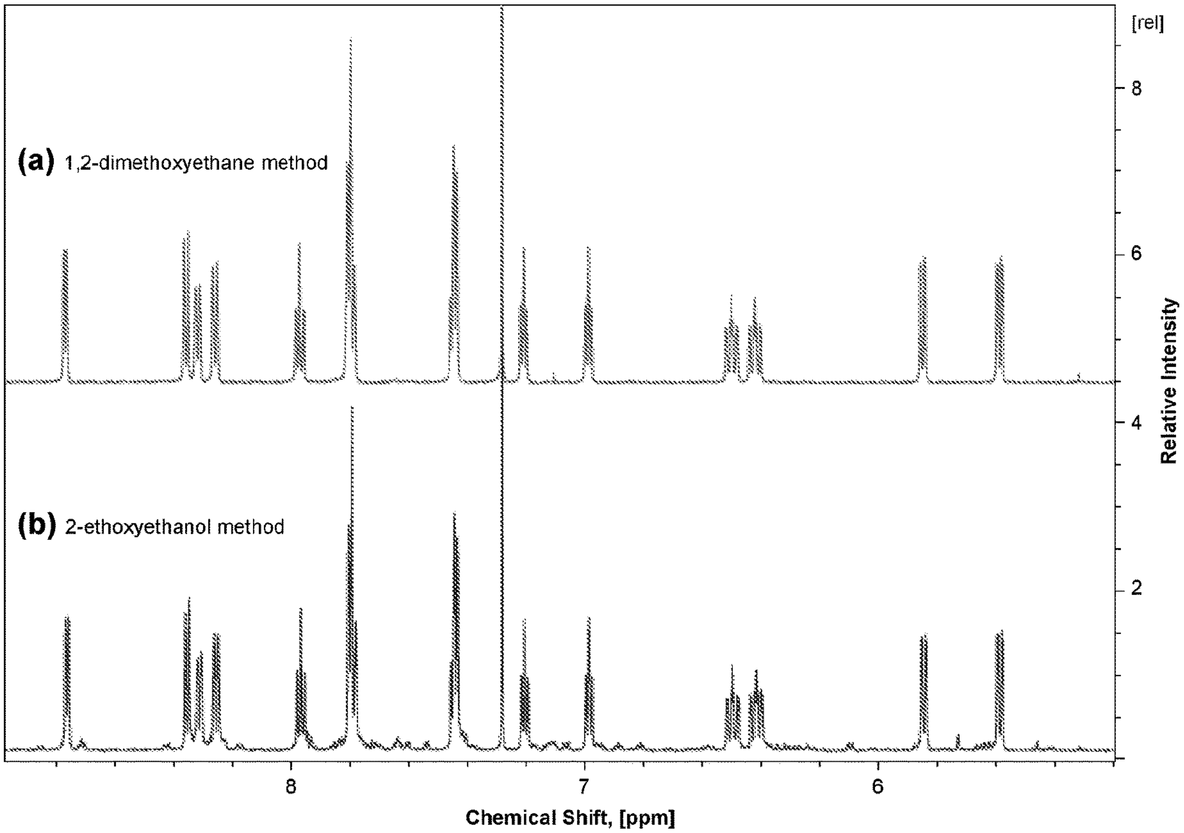
FIG. 9, part (a) is a plot of the $^1$H NMR spectrum of a crude FIrpic sample, according to one embodiment.

FIG. 9 illustrates the proton nuclear magnetic resonance spectra of crude FIrpic synthesized following the conventional method of using 2-ethoxyethanol (in lower panel (b)) compared to following the method described herein of using DME (in upper panel (a)). The crude sample of FIrpic formed by the conventional method (b) has notable impurities whereas the crude sample of FIrpic formed by the method described herein (a) has much higher purity and no additional purification steps were included.

In Use

Various embodiments described herein may be used to synthesize a wide variety of luminescent materials covering a broad spectral range. In particular, one embodiment described herein produces organometallic iridium complexes that may be useful as electroluminescent materials, for example, OLEDs. Moreover, the synthesized organometallic iridium complexes as described herein may be used as plastic scintillators in gamma radiation detectors.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method of synthesizing an organometallic iridium monomer compound, the method comprising:

obtaining a dimeric iridium compound having a halogenated bridge;

refluxing a mixture comprising the dimeric iridium compound, a base, an ancillary ligand, and 1,2-dimethoxyethane for forming a precipitate of an organometallic iridium monomer, wherein the refluxing is performed at about the boiling point of 1,2-dimethoxyethane for a duration of less than eight hours; and filtering the refluxed mixture to collect the organometallic iridium monomer precipitate.

2. The method of claim 1, wherein the ancillary ligand is selected from the group consisting of: acetylacetone and a derivative of acetylacetone, the derivative comprising an acetylacetone structure.

3. The method of claim 2, wherein the acetylacetone derivative comprises at least one substituent selected from the group consisting of: methyl, trifluoromethyl, cyclopentyl, cyclohexyl, and phenyl.

4. The method of claim 1, wherein the ancillary ligand is selected from the group consisting of: picolinic acid and a derivative of picolinic acid, the derivative molecule comprising a pyridine-2-carboxylate.

5. The method of claim 4, wherein the picolinic acid derivative comprises at least one substituent selected from the group consisting of: hydroxy, trifluoromethyl, fluoro, and difluoro.

6. The method of claim 1, wherein the dimeric iridium compound is a cyclometallated iridium complex.

7. The method of claim 1, comprising rinsing the precipitate in a first rinse comprising water followed by a second rinse comprising alcohol; and drying the precipitate.

8. The method of claim 7, wherein a purity of the rinsed and dried precipitate is at least 98% pure.

9. The method of claim 1, wherein the base is selected from the group consisting of: sodium carbonate and potassium carbonate.

10. The method of claim 1, wherein the mixture comprises a stoichiometric ratio of five base molecules to one iridium atom in the dimeric iridium compound (5:1).

11. The method of claim 1, wherein the mixture comprises a stoichiometric ratio of two ancillary ligand molecules to one iridium atom in the dimeric iridium compound (2:1).

12. The method of claim 1, wherein the mixture comprises a volume to millimolar ratio of 1,2-dimethoxyethane to dimeric iridium compound of at least 15:1.

13. The method of claim 1, wherein a yield of pure organometallic iridium monomer is in a range of about 75% to about 95% of a theoretical amount calculated based on the dimeric iridium compound as a limiting reagent of the mixture during refluxing.

14. The method of claim 1, wherein the method does not include an extraction step for purification.

15. The method of claim 1, wherein the method does not include column chromatographic purification.

16. The method of claim 1, wherein the dimeric iridium compound has at least one ligand comprising a phenylpyridine.

17. The method of claim 1, wherein the organometallic iridium monomer precipitate is FIrpic, wherein a yield of FIrpic is in a range of about 90% to about 95% of a theoretical amount calculated based on the dimeric iridium compound as a limiting reagent in the mixture during refluxing.

18. The method of claim 1, wherein the dimeric iridium compound is selected from the group consisting of: $[(F_2ppy)_2IrCl]_2$ and $[(ppy)_2IrCl]_2$.

19. The method of claim 1, wherein the refluxing of the mixture results in a chemical reaction as follows:

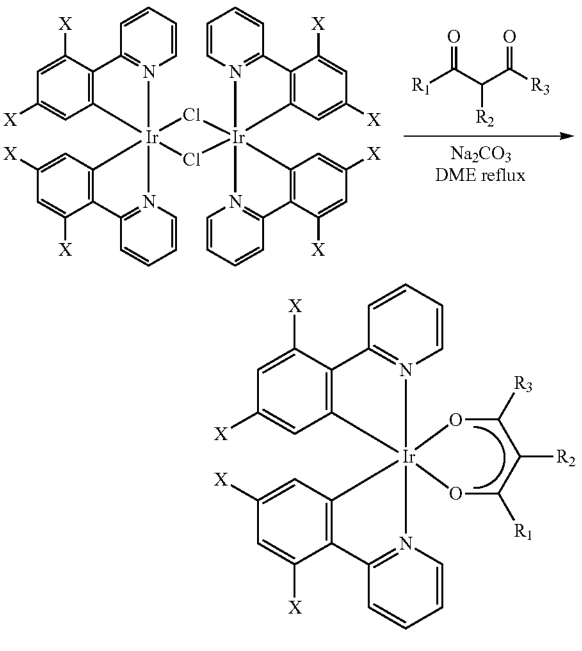

wherein X is selected from the group consisting of hydrogen and fluorine, wherein $R_1$, $R_2$, and/or $R_3$ is at least one substituent selected from the group consisting of: hydrogen, methyl, trifluoromethyl, cyclopentyl, cyclohexyl, and phenyl.

20. The method of claim 1, wherein the refluxing of the mixture results in a chemical reaction as follows:

wherein Z is selected from the group consisting of: hydrogen and fluorine, wherein R is

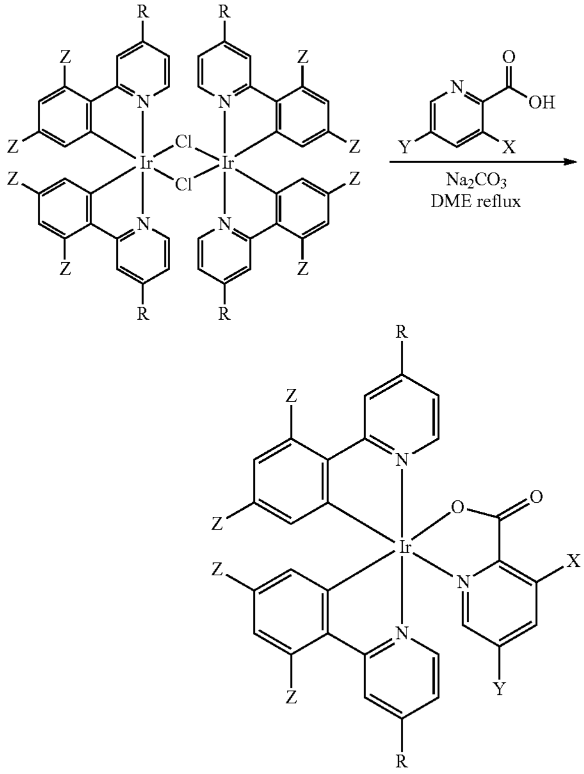

selected from the group consisting of: hydrogen and xylyl, wherein X and/or Y is at least one substituent selected from the group consisting of: hydrogen, hydroxy, trifluoromethyl, fluoro, and difluoro.

* * * * *